United States Patent [19]

Lindberg et al.

[11] Patent Number: 4,875,806
[45] Date of Patent: Oct. 24, 1989

[54] NODE INTERSECTION BETWEEN COLUMNS AND PONTOON MEMBERS AT A TENDON-MOORED PLATFORM

[75] Inventors: Kaj Lindberg, Mölndal; Gerry Steen, Gothenburg; Elon Germundson, Torslanda, all of Sweden

[73] Assignee: Gotaverken Arendal AB, Gothenburg, Sweden

[21] Appl. No.: 168,356

[22] Filed: Mar. 15, 1988

[30] Foreign Application Priority Data

Mar. 20, 1987 [SE] Sweden ................................ 8701162

[51] Int. Cl.$^4$ ............................................... E02D 5/54
[52] U.S. Cl. .................................... 405/224; 114/265; 403/263; 405/208
[58] Field of Search ....................... 405/224, 207, 208; 114/264, 265, 266; 403/263, 271

[56] References Cited

U.S. PATENT DOCUMENTS

| 2,049,605 | 8/1936 | Driemeyer | 405/224 X |
| 3,160,135 | 12/1964 | Vries | 114/265 X |
| 3,822,053 | 7/1974 | Daily | 403/263 X |
| 3,921,960 | 11/1975 | Bright | 403/263 X |
| 4,320,993 | 3/1982 | Hunter | 405/224 |
| 4,333,725 | 6/1982 | Peterson | 403/271 |
| 4,648,750 | 3/1987 | Horton | 405/208 |

FOREIGN PATENT DOCUMENTS

A2117477  10/1983  United Kingdom ............... 403/263

Primary Examiner—Peter A. Aschenbrenner
Assistant Examiner—Thomas A. Rendos
Attorney, Agent, or Firm—Wegner & Bretschneider

[57] ABSTRACT

A node intersection between circular columns and pontoon members at a tendon-moored semisubmersible offshore platform. The pontoon members have a box shape, defined by vertical side walls, a horizontal deck and a horizontal bottom skin, joined together into a foursided frame, via the columns. The node intersection comprises vertical bulkheads within the lower ends of the columns, forming internally intersecting continuations of the vertical sidewalls.

6 Claims, 5 Drawing Sheets

NODE INTERSECTION BETWEEN COLUMNS AND PONTOON MEMBERS AT A TENDON-MOORED PLATFORM

FIELD OF THE INVENTION

This invention relates to tendon-moored semisubmersible offshore platforms (Tension Leg Platform - TLP), wherein the pontoon members are interconnected into a foursided frame, via said columns.

BACKGROUND OF THE INVENTION

Because of the stiff mooring method, the foursided frame and the columns in a tendon-moored platform may be subjected to very large wave induced loads.

The node intersections between columns and pontoon members are especially critical structural engineering elements, subjected to large load concentrations.

SUMMARY OF THE INVENTION

One object of the invention is to provide a node intersection which is based upon a simple production methods with continuing bond, enhancing availability for welding and inspection.

The present invention therefore relates to a node intersection between circular columns and pontoon members at a tendon-moored semisubmersible offshore platform, wherein the pontoon members have a box shape, defined by vertical side walls, a horizontal deck and a horizontal bottom skin, joined together into a foursided frame, via said columns, and comprising vertical bulkheads within the lower ends of the columns, forming internally intersecting continuations of said vertical sidewalls.

According to a preferable embodiment of the invention, the internal bulkheads extend to a higher level than the sidewalls and are connected to tweendecks above and below the deck and bottom skin of the pontoon sections respectively. The deck and the bottom skin of the pontoon members are preferably continued into the columns and connected to the extended parts of the side skins.

When the pontoon members are connected along rounded corners, each corner preferably continues for some distance on the inside of the column side skin, where it is cut along a curved line which connects tangentially to the edge of the notch. The edge of each rounded corner bordering to the horizontal structure preferably continues into the column and is connected to the adjoining vertical structure at the edge of the notch.

The edge of each rounded corner bordering to each vertical structure may alternatively continue into the column and curve 180° back towards the side skin of the column via the edge of the notch.

BRIEF DESCRIPTION OF THE DRAWINGS

One embodiment of the invention will now be described in detail with reference to the accompanying drawings, in which.

DESCRIPTION OF A PREFERRED EMBODIMENT

Figure 1:
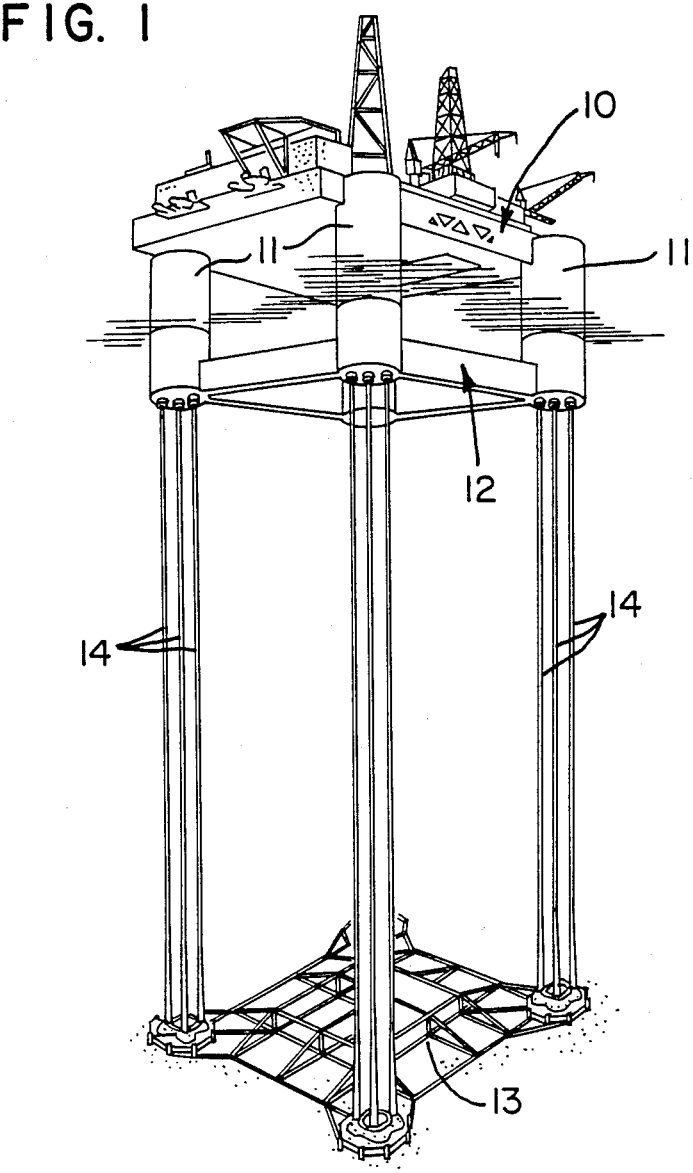
FIG. 1 is a perspective view showing an offshore platform, which is moored via tendons to a sea bottom foundation, and to which the invention is applicable.

The offshore platform shown in FIG. 1 may be used for production and separation of oil and/or gas, and largely comprises a work deck 10, which carries production equipment, stores and living quarters for personnel. The work deck is supported on four columns 11, arranged in the corners of a rectangular pontoon frame 12.

The vessel is moored to a sea bottom foundation 13 via a number of tendons 14 (so called tension legs), to keep the platform in its position above the oil well, or a central well-head to which a number of remote wells are connected.

Tendon-moored platforms of the above described type are well known in the field, and it is also well known that the loads on columns and pontoon frame are considerable, partly because of the wave movements and partly because of the influence of the mooring system.

The connections between the columns and the pontoon sections are especially critical with a large number of intersecting welds, and stress concentrations should be avoided.

The columns 11 are circular in section, while the pontoon members 15 forming the pontoon frame are rectangular in section with rounded corners. The diameter of the columns is bigger than the width of the pontoon members. Each pontoon member is defined by vertical side walls 16 and 17, a bottom skin 18 and a deck 19.

Figure 2:
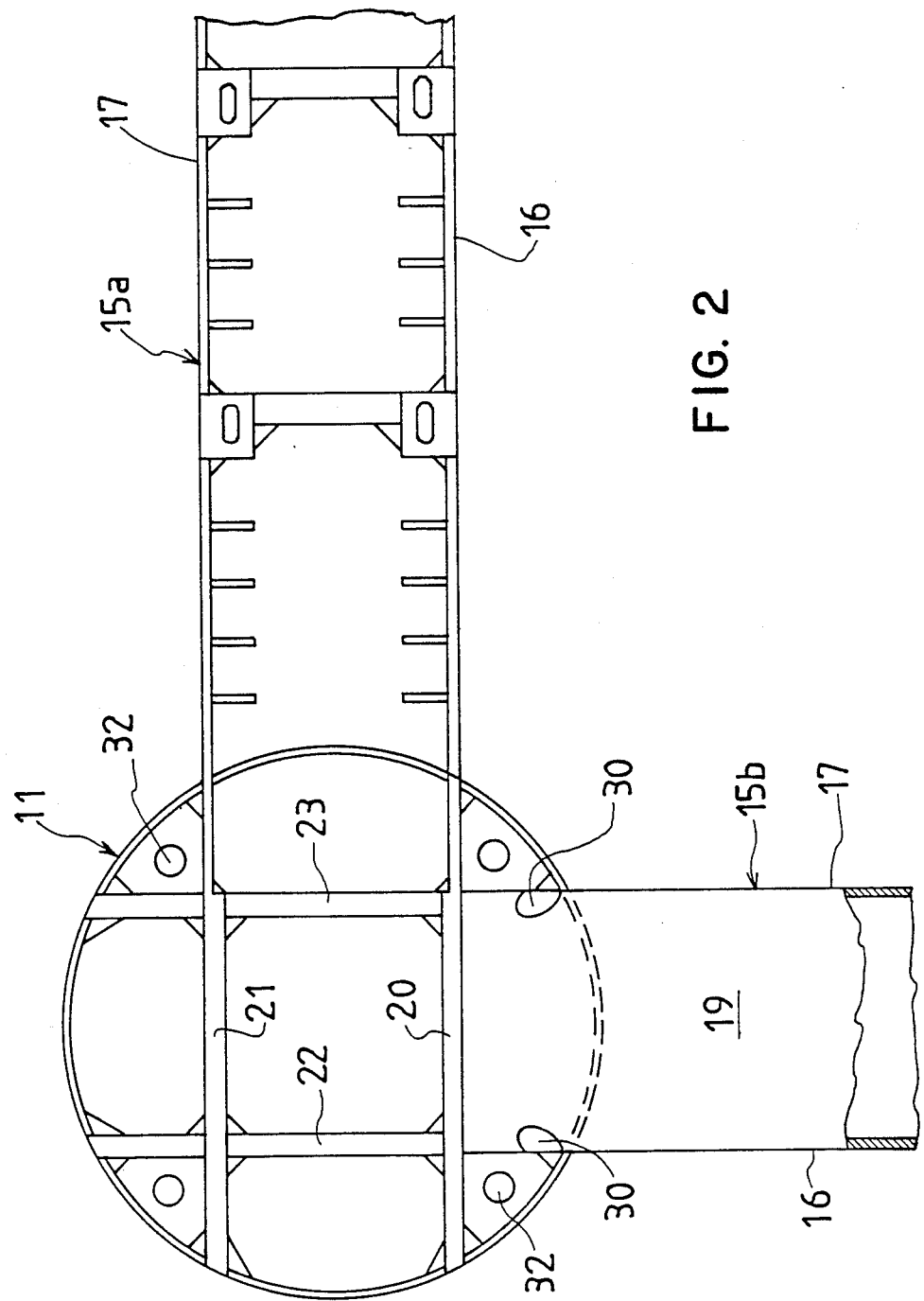
FIG. 2 is a horizontal section through a column and two connecting pontoon members.

FIG. 2 shows a horizontal section through a column 11 and two connecting pontoon members 15. The column is provided with vertical bulkheads within the node area. In said FIG. 2, two of these bulkheads 20, 21 run horizontally at a distance from each other, that equals the distance between the side walls of the pontoon member 15a connecting from the right side.

Correspondingly, the two vertical bulkheads 22, 23 running vertically in FIG. 2, are in line with the side walls of the transverse pontoon member 15b. All these bulkheads 20–23 intersect at right angles to each other.

Figure 3:
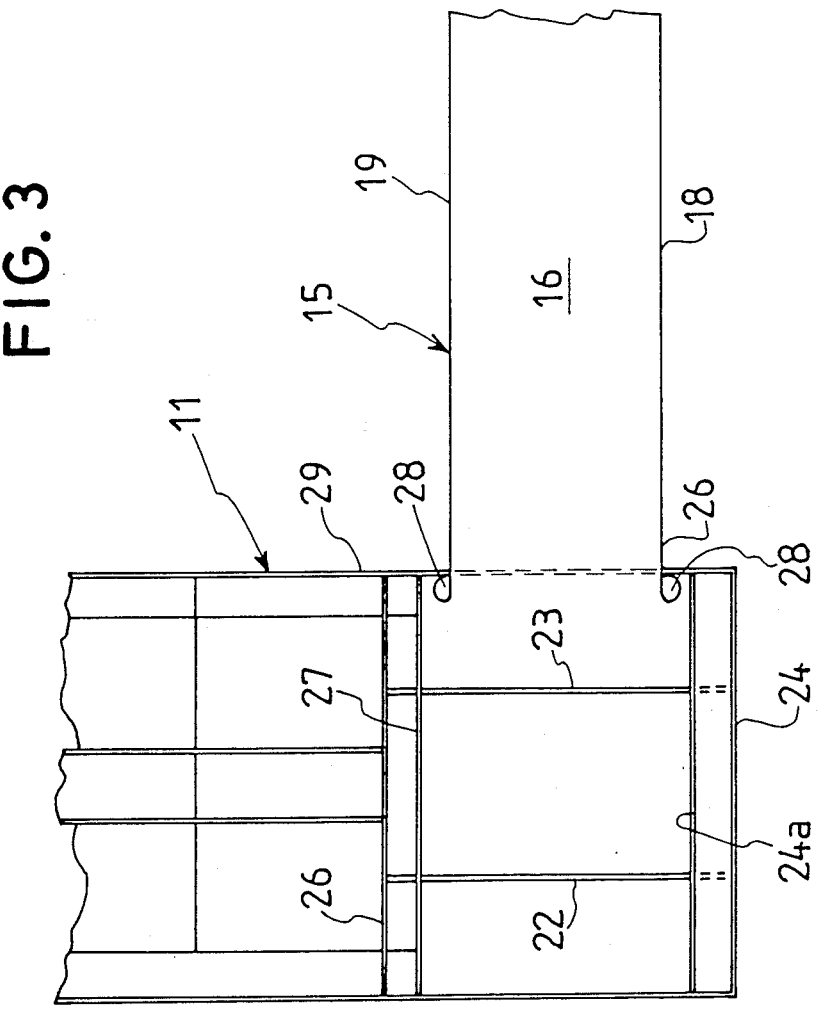
FIG. 3 is a vertical section through a column and a connecting pontoon member.

In a somewhat smaller scale, FIG. 3 shows a vertical section through a column 11 and a connecting pontoon member 15. The columns have double bottom, defined by bottom skin 24 and tank roof 24a. The latter is positioned below the bottom skin 18 of the connecting pontoon member.

The column has two tweendecks 26, 27 above the deck 19 of the connecting pontoon member.

Figure 4:
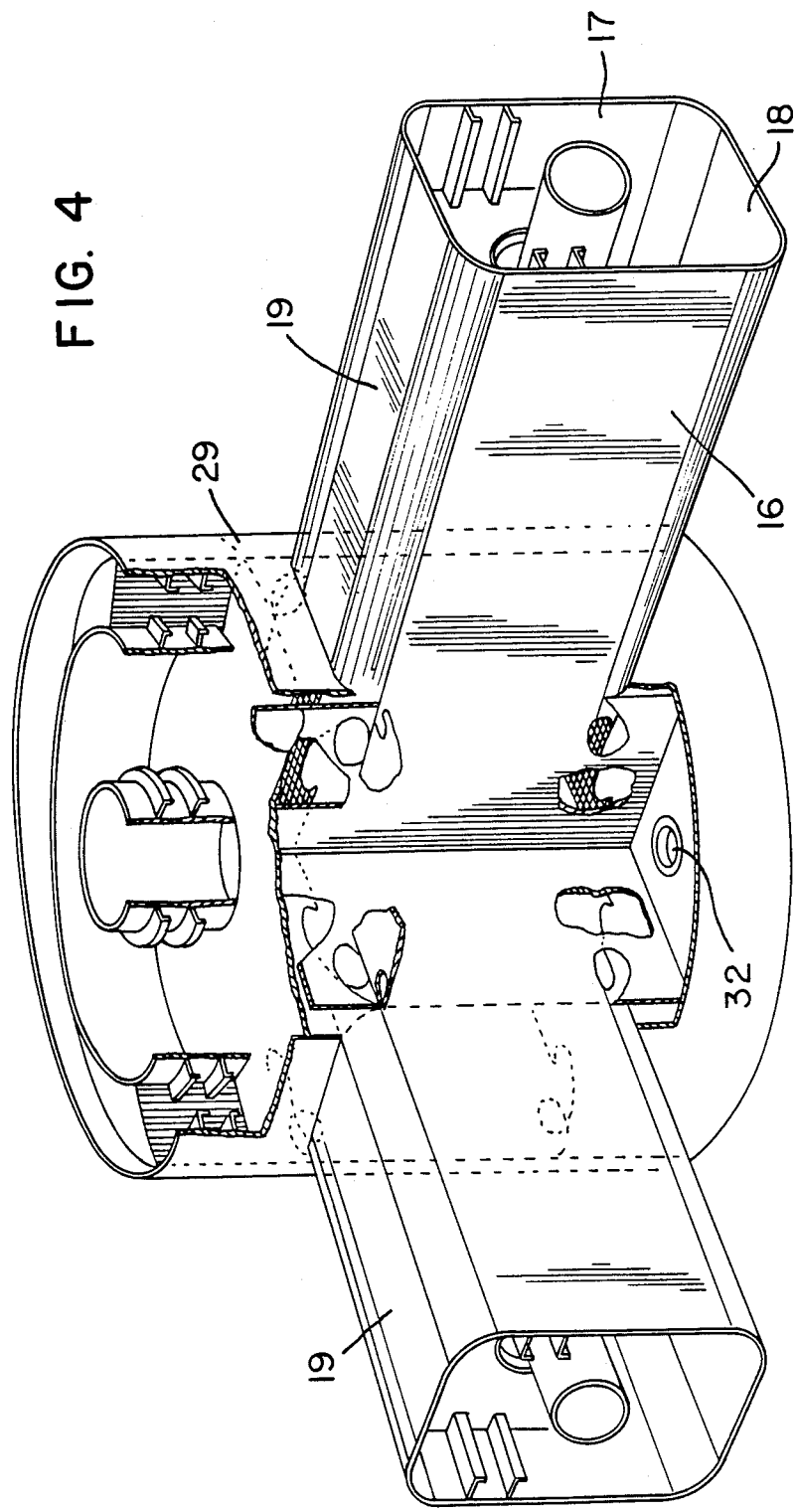
FIG. 4 is a broken perspective view showing the intersection between a column and two pontoon members.
Figure 5:
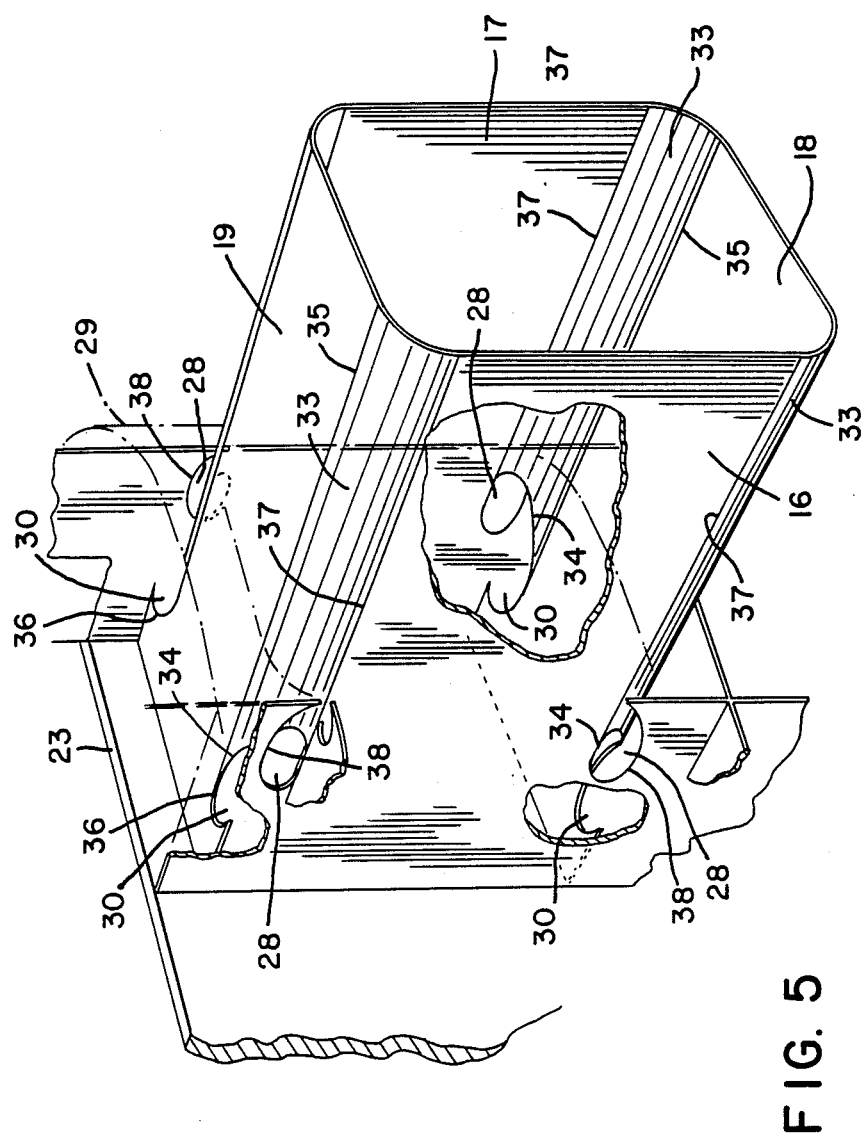
FIG. 5 shows a part of the intersection in FIG. 4 in a larger scale.

The side walls 16, 17 of the pontoon members continue in an increased vertical dimensioning within the columns, and are welded to the transversal vertical bulkhead 23, the tweendeck 27 and the tank roof 24a. In order to avoid stress concentrations, the plate material is provided with notches 28 within the columns, near to their side skins 29. The design of these notches is better understood from FIGS. 4 and 5.

Similar notches 30 in the decks 19 and bottom skins of the pontoon members, are shown in FIG. 2.

Watertight passages 32 for the tendons 14 pass through the double bottom skin and may be prolonged upwards through the tweendecks 26, 27.

The side skins, deck and bottom skin of the pontoon members are connected via rounded corners 33. Each of these corners continue for some distance on the inside of the column side skin 29, where it is cut along a curved line 34 which connects tangentially to the edge of the notches 28 and 30.

The border line 35 between the rounded corner and the connecting horizontal deck 19 and bottom skin 18 respectively continues via the edge 36 of the notch 30 and connects to the adjacent vertical bulkhead.

The border line 37 between the rounded corner and the connecting vertical side skins 16, 17 continues via the edge 38 of the notch 28 and curves 180° backwards reaching the side skin 29 of the column.

The invention is not limited to the above described embodiment, but several modifications are possible within the scope of the accompanying claims.

What we claim:

1. A tendon-moored semisubmersible offshore platform comprising:
    columns;
    pontoon members interconnected into a foursided frame via said columns, said pontoon members being defined by vertical side walls, a horizontal deck, and a horizontal bottom skin; and
    at least one node intersection which includes vertical bulkheads that intersect continuations of said vertical sidewalls within lower ends of said columns.

2. A tendon-moored semisubmersible offshore platform according to claim 1, wherein said vertical bulkheads extend to a level higher than said sidewalls and are connected to tweendecks above said horizontal deck and below said horizontal bottom skin.

3. A tendon-moored semisubmersible offshore platform comprising:
    columns;
    pontoon members interconnected into a foursided frame via said columns, said ponton members being defined by vertical side walls, a horizontal deck, and a horizontal bottom skin; and
    at least one node intersection which includes vertical bulkheads that intersect continuations of said vertical sidewalls within lower ends of said columns, wherein said vertical bulkheads extend to a level higher than said sidewalls and are connected to tweendecks above said horizontal deck and below said horizontal bottom skin, and wherein said horizontal deck and said horizontal bottom skin form a continuous connection into said columns.

4. A tendon-moored semisubmersible offshore platform comprising
    columns;
    pontoon members interconnected into a foursided frame via said columns, said pontoon members being defined by vertical side walls, a horizontal deck, and a horizontal bottom skin; and
    at least one node intersection which includes vertical bulkheads that intersect continuations of said vertical sidewalls within lower ends of said columns and includes notches for avoiding stress concentration.

5. A tendon-moored semisubmersible offshore platform according to claim 4, wherein said pontoon members have rounded corners which continue into said columns and are cut along a curved line which connects tangentially to an edge of said notches.

6. A tendon-moored semisubmersible offshire platform according to claim 5, wherein the edge of said notches continues into said column and curves 180° back toward a side skin of said column via the edge of said notches.

* * * * *